United States Patent Office 3,047,641
Patented July 31, 1962

3,047,641
PRODUCTION OF CHLOROFLUOROPROPANE
Ronald H. Neill, Montclair, and Cyril Woolf, Morristown, N.J., assignors to Allied Chemical Corporation, New York, N.Y., a corporation of New York
No Drawing. Filed Mar. 22, 1960, Ser. No. 16,629
3 Claims. (Cl. 260—653.7)

This invention relates to processes for making 2-chloroheptafluoropropane, $CF_3CClFCF_3$, B.P. minus 2° C. This material, a known compound, has particular utility as a refrigerant, and as a stable heat transfer medium in general.

Previously proposed methods for making 2-chloroheptafluoropropane include direct or indirect use of elemental fluorine. For example, usually 2-chloroheptafluoropropane is made by elemental fluorine fluorination of $C_3F_5Cl_3$. The operating disadvantages involved in fluorination by means of elemental fluorine are obvious.

A major object of this invention lies in the provision of a process for making 2-chloroheptafluoropropane by procedure embodying none of the operating disadvantages inherently characteristic of fluorination methods requiring use and handling of elemental fluorine. A further object includes provision of a 2-chloroheptafluoropropane manufacture procedure which is a gas-phase, catalytic operation employing ordinary anhydrous HF as the fluorinating agent.

The invention comprises the discovery of a certain suitable chlorofluorocarbon compound starting material, of a certain catalyst which effectively catalyzes reaction of such starting material and HF to form the sought-for 2-chloroheptafluoropropane product, and of the operating conditions needed to effectuate the catalysis reaction in good yields. In accordance with the invention, it has been found that 2-chloroheptafluoropropane can be made in a gas-phase catalysis operation, using HF as the fluorinating agent, by subjecting vapor-phase 3-chloropentafluoropropene-1 to the action of substantially anhydrous HF at certain elevated temperatures in the presence of activated carbon catalyst.

Generally, practice of the invention includes effecting reaction between gaseous 3-chloropentafluoropropene-1 and gaseous substantially anhydrous HF at relatively high reaction temperatures while in the presence of activated carbon catalyst, and recovering 2-chloroheptafluoropropane from the resulting reaction products. More particularly, gaseous 3-chloropentafluoropropene-1 and gaseous anhydrous HF are continuously metered, mixed and fed into a tubular reactor which is packed preferably full with activated carbon catalyst and which may be made of inert material such as nickel, Monel, or Inconel or steel lined with graphite or Alundum, and enveloped in a suitable tubular electric furnace provided with automatic heating means for reaction zone temperature maintenance. Product recovery may be effected more or less conventionally as in this art. For example, reaction zone exit may be passed thru a water scrubber to remove HF and HCl, and the exit of the scrubber may be dried and then totally condensed in the receiver by suitable cooling, such as by use of a Dry Ice-acetone mixture. The resulting condensate then may be fractionally distilled in suitable equipment to facilitate recovery of sought-for product, and separation of unreacted and other materials which desirably may be recycled.

Major critical factors embodied in practice of the invention comprise selection of the 3-chloropentafluoropropene-1 starting material, use of activated carbon catalysts, and use of certain relatively high reaction temperatures.

3-chloropentafluoropropene-1, $CF_2ClCF=CF_2$, starting material is a known, available compound having a boiling point of about 7.5° C.

In accordance with the invention, when $CF_2ClCF=CF_2$ is reacted with HF in the presence of the activated carbon catalyst and at substantially high reaction temperature, the 2-chloroheptafluoropropane sought-for product is obtained in good yields. The mechanisms of the reactions are completely unknown, and there appears to be no known theoretical explanation as to why the allylic chlorine of the $CF_2ClCF=CF_2$ starting material should be displaced, more fluorine added in on the other terminal carbon atom attached to the double bond, and chlorine added in on the carbon atom of the #2 position. However, regardless of whatever mechanisms may be involved, according to the invention it has been found that activated carbon effectively catalyzes this most remarkably surprising reaction between HF and 3-chloropentafluoropropene-1 to form 2-chloroheptafluoropropane in good yields. This discovery in conjunction with the equally important discovery of temperature reaction conditions needed together provide an easily controllable simple gas-phase catalytic method of making material heretofore produced by the operationally difficult and hazardous elemental fluorine fluorination route.

The activated carbon catalysts which may be used in practice of the invention are granular materials readily available from several commercial sources, suitable materials being various grades of around 8–14 mesh activated carbon such as Columbia 6G, Columbia SW, and Darco. Granular size of the activated carbon employed is not highly critical. Ordinarily, reaction is carried out in elongated tubular reactors, and in these instances it is desirable to employ activated carbon granules of average mesh size between $\frac{1}{20}$ and $\frac{1}{4}$ of the reactor diameter, and better conditions are those in which a reactor is substantially completely filled with granules of average mesh size of about $\frac{1}{8}$ or $\frac{1}{10}$ of the diameter dimension of the reactor.

Relatively higher reaction temperatures appear to be a notably critical factor in the successful practice of the invention. It has been found that reaction temperature of not less than about 475° C. is needed to effectuate any worthwhile catalytic production of the 2-chloropentafluoropropane. At significantly lower temperatures, the reaction of the invention, from viewpoint of 2-chloropentafluoropropane production, appears to be of no substantially practical value. At higher temperatures, the reaction has been found to proceed more satisfactorily. While catalysis temperatures may run as high as about 700° C., higher temperatures provide no apparent advantages. To promote good yields of sought-for product and minimize decomposition to methanes by reason of too high heating, temperatures in the range of about 500–625° C. are preferred.

As above indicated, nothing is known as to the theoretical aspects of the reaction involved, and consequently theoretical mol ratios of HF to 3-chloropentafluoropropene-1 starting material are not known. However, experience seems to indicate that mol ratios of reactants are not as notably critical as reaction temperatures. Generally, the quantity of HF employed relative to the 3-chloropentafluoropropene-1 starting material may be any amount sufficient to react with a substantial quantity of the 3-chloropentafluoropropene-1. At low HF to organic mol ratio of say 0.5:1, conversions of organic are low, requiring recycling of undesirable amounts of unreacted starting material, while at high ratios of say 4–4.5:1, HF recovery becomes a problem. As the matter of yield of sought-for 2-chloropentafluoropropane becomes important, it is desirable to use HF in amount equivalent to at least about one molecular proportion of substantially anhydrous HF per mol of 3-chloropentafluoropropene-1, and for good overall operation mol ratio of HF to 3-chloropentafluoropropene-1 is preferably substantially in the range of 1:1 to 3:1.

While pressures above and below atmospheric may be employed, an important advantage arising from the invention is that the reaction may be carried out efficiently at substantially atmospheric pressure. It will be understood that in the practice of many gas-phase catalytic processes of the general type described herein, i.e. processes in which a gas stream is flowed successively thru reaction and product recovery systems, for all practical purposes, as relate to reactions themselves, pressure is considered as being substantially atmospheric. Technically, however, pressures in such systems are sufficiently on the positive side to effect commercially satisfactory gas flow through the apparatus train. Thus, strictly speaking, depending upon factors such as apparatus design, mesh size of catalyst, unpacked gas space in the reactor, desired contact time, etc., actual pressures in systems of the kind under consideration may vary from 2 up to say 10–15 pounds gauge, and accordingly operations of this type are included in the designation of substantially atmospheric pressure.

Contact time may be varied considerably without noticeable disadvantage to high process efficiency. Generally, increasing contact time and reactor temperature results in higher HF utilization and conversion of 3-chloroheptafluoropropene-1, and the lowering of contact time and reactor temperature results in lower HF utilization and organic conversion. Contact times may lie in the range of 1–100 seconds, and more usually and preferably in the range of 2–20 seconds. To a substantial extent, contact time, reactor temperature and ratio of reactants are interrelated, and depending upon apparatus and the particular operation at hand, optimum conditions as to contact time may be determined by test runs.

In following Examples 1 and 2, the reactor consisted of a 1″ I.D., 36″ long nickel tube heated externally by an enveloping 30″ long tubular electric furnace. The reactor was provided at the inlet end with suitable means for metered introduction of gaseous 3-chloropentafluoropropene-1, $CF_2ClCF=CF_2$, B.P. 7.5° C., and anhydrous HF, while the reactor outlet was connected to the inlet end of a products recovery train. The catalyst employed consisted of activated carbon and was activated carbon (commercially available Columbia 6G grade) of 8–14 mesh, size being such as to provide granules averaging about 1/10 of the reactor diameter. The reactor was completely filled with catalyst, total volume amounting to about 0.45 liter. Pressure in the reactor system was about 2 lbs. p.s.i.g., i.e. sufficient to move the gas stream thru the reactor system at the contact times indicated and thru the remainder of the apparatus train. Percentages noted are by weight.

*Example 1.*—During a period of about 3 hrs., about 510 grams (3.05 mols) of 3-chloropentafluoropropene-1 and about 120 g. (6.0 mols) of anhydrous HF were premixed and metered into the reactor system. Mol ratio of HF to organic starting material was about 2:1. Throughout the run temperature within the reactor was maintained in the range of about 550 to 570° C. Overall contact time was approximately 6.8 secs. Products exiting the reactor were water-scrubbed to remove HF and HCl, dried by passage thru a $CaCl_2$ drying tower, and condensed and collected in a Dry-Ice-acetone cooled receiver. A total of 89.0 g. (4.45 mols) of HF and 16.4 g. (0.45 mol) of HCl were scrubbed out of the reactor exit gas. A total of 459 g. of material was condensed and recovered in the receiver. On careful fractional distillation, the following materials were isolated, and by analysis, including infrared absorption spectrum and gas chromatography, were established to be: 107 g. (1.02 mols) of monochlorotrifluoromethane, $CClF_3$, B.P. minus 82° C.; 5 g. (0.03 mol) of monohydroheptafluoropropane, $CF_3CFHCF_3$, B.P. minus 17–18° C.; 348 g. (1.70 mols) of the sought-for product 2-chloroheptafluoropropane, $CF_3CClFCF_3$, B.P. minus 2° C.; 31 g. (0.17 mol) of 2-monohydro-2-monochlorohexafluoropropane, $CF_3CHClCF_3$, B.P. 15° C.; and a trace of 1,1, dichlorotetrafluoropropene-1, $CF_3CHF=CCl_2$, B.P. 46° C. The analysis noted indicated no evidence of the presence of $CF_3CF=CF_2$. Conversion of organic starting material fed to other product was substantially 100°. The yield of 2-chloroheptafluoropropane, on the basis of 3-chloropentafluoropropene-1 starting material fed was about 56%. Yield of 2-chloroheptafluoropropane, on the basis of the 3-chloropentafluoropropene-1 starting material reacted was about 56.5%.

*Example 2.*—During a period of about 1.5 hrs., 215 g. (1.29 mols) of 3-chloropentafluoropropene-1 and 67 g. (3.35 mols) of anhydrous HF were premixed and metered into the reactor. Proportioning of reactants was such that mol ratio of HF to organic was about 2.6:1. Throughout the run temperature in the reactor was maintained approximately in the range of 500 to 540° C. Overall contact time was approximately 8 seconds. Exit of the reactor was handled as in Example 1. A total of about 49.4 g. (2.47 mols) of HF and about 13.7 g. (0.38 mol) of HCl were scrubbed out of the reactor exit gas, and a total of about 216 g. of condensate were recovered in the Dry Ice trap. On fractional distillation, and analysis as indicated in Example 1, the following materials were recovered: 52 g. (0.31 mol) of monohydroheptafluoropropane; 137 g. (0.67 mol) of sought-for 2-chloroheptafluoropropane; 5 g. (0.03 mol) of unreacted monochloropentafluoropropene starting material; and 21 g. (0.11 mol) of 2-monohydro-2-monochlorohexafluoropropane. The analysis noted indicated no evidence of $CF_3CF_2=CF_2$. Conversion of starting material to other products was about 98%. Yield of 2-chloroheptafluoropropane, on the basis of the 3-chloropentafluoropropene-1 fed, was about 52%, and yield of 2-chloroheptafluoropropane, on the basis of the 3-chloropentafluoropropene-1 reacted was 53%.

We claim:

1. The process for making 2-chloroheptafluoropropane in a gas-phase reaction which process comprises subjecting vapor-phase 3-chloropentafluoropropene-1 to the action of substantially anhydrous HF, in amount sufficient to react with a substantial quantity of said 3-chloropentafluoropropene-1, while maintaining temperature substantially in the range of 475–625° C. and while in the presence of activated carbon catalyst, and recovering 2-chloroheptafluoropropane from the resulting reaction product.

2. The process for making 2-chloroheptafluoropropane in a gas-phase reaction which process comprises subjecting vapor-phase 3-chloropentafluoropropene-1 to the action of at least about one molecular proportion of substantially anhydrous HF while maintaining temperature substantially in the range of 500–625° C. and while in the presence of activated carbon catalyst, and recovering 2-chloroheptafluoropropane from the resulting reaction product.

3. The process of claim 2 in which mol ratio of HF to 3-chloropentafluoropropene-1 is substantially in the range of 1:1 to 3:1.

References Cited in the file of this patent

UNITED STATES PATENTS 2,005,706    Daudt et al. _____ June 18, 1935